Feb. 23, 1960  A. KANTROWITZ  2,925,830
FLUID FLOW RECTIFIER
Filed April 17, 1956
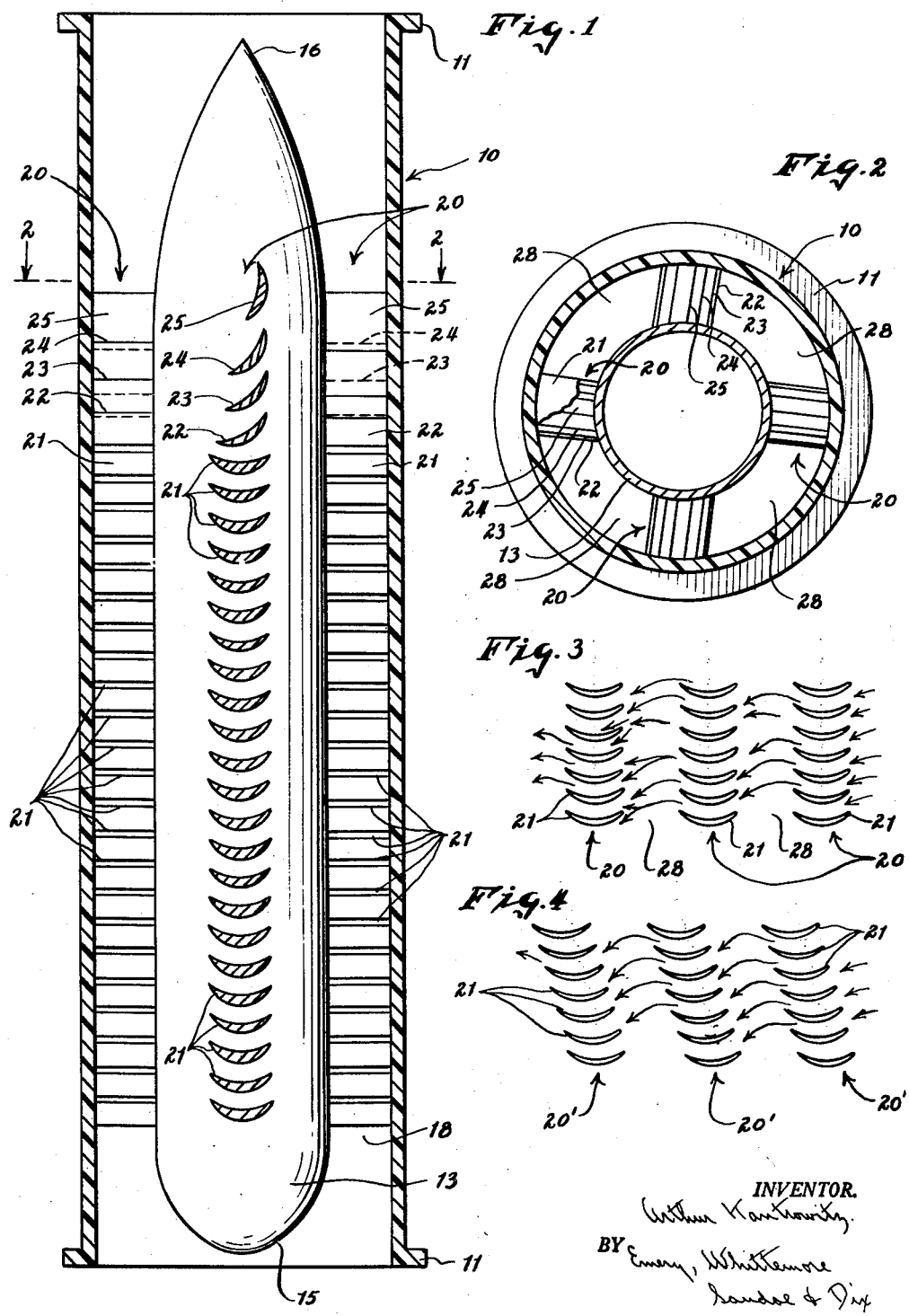
INVENTOR.
Arthur Kantrowitz
BY Emery, Whittemore,
Saunders & Dix
ATTORNEYS United States Patent Office 2,925,830
Patented Feb. 23, 1960

2,925,830
FLUID FLOW RECTIFIER

Arthur Kantrowitz, Arlington, Mass.

Application April 17, 1956, Serial No. 578,623

15 Claims. (Cl. 138—37)

This invention relates to a fluid flow rectifier which serves the same purpose as a check valve, but which avoids the use of moving mechanical parts.

It is an object of the invention to provide an improved fluid flow rectifier in which the ratio of back flow to forward flow is very much lower than with fluid flow rectifiers of the prior art.

Rectifiers of the character indicated are important for application to pulse jets; but such rectifiers are applicable in other fields of fluid mechanics where the use of moving mechanical parts is objectionable or inconvenient.

Another object of the invention is to provide a fluid flow rectifier operating on a new principle which employs a helical flow with a recurring forward component for opposing the back pressure. In its preferred construction, this invention provides several cascades of blades with the chord-wise extent tof the blades extending circumferentially in the fluid passage, or at least with a substantial circumferential component.

The cascades are spaced from one another angularly around the cross section of the passage and the space between the cascades provides unobstructed passages through which the fluid travels in the direction of intended free flow. The blades are shaped so that they present streamlined surfaces to the forward flow of the fluid and have a minimum of effect on the fluid flow as long as the flow is in a forward direction. When the forward flow stops and the fluid begins to flow in a reverse direction, the blades are in position and so shaped as to impart a flow to the fluid with a substantial circumferential component and preferably a flow which changes in direction in response to its contact with the blades and its reaction with the back pressure in the spaces between the cascades of blades.

The average direction of the longitudinal components of the helical flow is preferably backward with a slow pitch. This results in only a small amount of backward flow; and it has the advantage of maintaining continuous motion of the helically flowing fluid so that a constant force is obtained for opposing back flow of the fluid through the longitudinal passages between the cascades of blades.

Other objects, features and advantages of the invention will appear or be pointed out as the description proceeds.

In the drawing, forming a part hereof, in which like reference characters indicate corresponding parts in all the views;

Figure 1 is a sectional view through a fluid flow rectifier made in accordance with this invention;

Figure 2 is a sectional view taken on the line 2—2 of Figure 1;

Figure 3 is a development around a part of the circumference of the rectifier and along a portion of the length of the cascades to show the direction of fluid flow through the passage; and Figure 4 is a view similar to Figure 3, but showing a modified form of the invention.

The rectifier shown in Figure 1 includes a tube or conduit 10 with flanged ends 11 by which the conduit is connected in a piping system in which the rectifier is to be used. There is a streamlined core 13 located within the conduit 10. In the preferred construction, the conduit 10 is cylindrical and the core 13 is also cylindrical except for a blunt nose 15 and a pointed trailing edge 16 which provide the stream-lining for the core. The longitudinal axis of the core 13 is preferably coincident with the longitudinal axis of the conduit 10.

The core 13 is of smaller diameter than the inside diameter of the conduit 10 so as to leave an annular passage 18 between the core and conduit. The radial width of this annular passage 18 is preferably less than one-half of the diameter of the core. Smaller cores can be used but the operation is less efficient.

Within the annular passage 18, and along the cylindrical portion of the core 13, there are cascades 20 of blades 21, 22, 23, 24 and 25. In the construction shown, there are four such cascades angularly spaced around the longitudinal axis of the rectifier.

Each of the cascades 20 is of limited circumferential extent around the longitudinal axis of the rectifier and there are unobstructed longitudinal passages 28 extending through the rectifier for the free flow of fluid in an upward direction in the drawing.

The blades 21–25 are preferably airfoil sections, and more efficient operation is obtained by using such sections; but sheet metal blades can be used. The last four blades 22–25 have their chord lines at progressively smaller angles to the longitudinal axis of the rectifier. The purpose of this construction is to impart a circumferential direction of flow to the fluid whenever the direction of flow is reversed and the fluid begins to flow backwardly, that is, in a downward direction in Figure 1. The blades 21 are shaped so that their lower faces are convex and their upper faces concave. When the flow through the passage 28 is in an upward direction, the blades 21 have little or no effect upon the flow; but when the direction of flow is reversed, the blades impart a circumferential direction of movement to the fluid. This will occur even though the blades 22–25 are omitted.

In the constructon illustrated, each of the blades 21 has a rounded edge at the side which is upstream to the circumferential flow, and the opposite side, which is the trailing edge in the circumferential flow, is a gradual taper.

The edges of the blades, are preferably swept back, as shown in Figure 2. This causes the fluid, during its circumferential flow, to meet the edge of the blade at the inner radius or root end before coming in contact with the blade at the outer radius or tip end. The advantage of this swept-back construction is in its tendency to distribute the circumferentially moving fluid more equally throughout the radial extent of the blade. Without this provision, low energy fluid tends to accumulate near the inner radius or root ends of the blades, with resulting reduction in the efficiency of the rectifier.

The number of blades in each cascade depends upon the operating conditions for which the rectifier is intended. It depends also upon the differences in the upstream and downstream pressures of the fluid, when these pressures have their maximum difference, and it depends to some extent upon the duration of the periods of excess back pressure and upon the amount of back flow which is to be tolerated. Four cascades 20 are shown in the drawing; but more or fewer can be used, depending upon the diameter of the passage 18 and upon the circumferential extent of the cascades. Friction losses are reduced by having fewer cascades and wider passages 18 between the cascades; but if the rectifier must withstand back pressures which at times are greatly in excess of the forward pressure, then narrower passages between the cascades must be used if equal velocities of circumferential flow are used to oppose the back pressure.

The blades 21–25 are rigidly connected at their inner and outer ends to the core 13 and contduit 10, respectively, and the core is held in place by the blades.

Figure 3 is a development of the passage between the core and conduit around substantially three-fourths of its extent. Three of the four cascades 20 are, therefore, shown in Figure 3. The direction of flow of the fluid is indicated by the arrows. As each stream of fluid comes from a passage between the blades 21, the stream has a slight upward component. The back pressure of the fluid, in the open passages 28, opposes this upward component and turns the flow sufficiently to give it a downward component. This change in direction of the circumferential flow is indicated by the shape of the arrow shafts in Figure 3.

As fluid enters the passages between the respective blades 21, it has, therefore, a downward component which reacts against the fixed blades 21. The concave faces of the blades 21 change the direction of flow so as to again provide an upward component as the streams leave the next cascade 20. It will be apparent that the passage of the circumferentially flowing fluid through the cascades, and the recurring provision of upward flow components to oppose the back pressure, prevent the back pressure of the fluid from producing any substantial flow of fluid downwardly in the open passage 28.

It is an object of the construction to permit continued generally helical flow of fluid as long as there is any excess of back pressure which must be opposed. This continuation of the helical flow is made possible by providing a passage for the fluid to enter on the far side of each of the open longitudinal passages 28. Imparting energy, to the helical flow of the fluid, develops force for resisting the back pressure of the fluid at the open longitudinal passages 28. This energy is imparted by the actual flow leakage which occurs.

Figure 4 shows a modified form of the invention. Corresponding parts in Figure 4 are indicated by the same reference characters as in Figure 3 but with a prime appended. The cascades 20' are placed with a slight helical angle instead of extending parallel to the longitudinal axis of the rectifier. This gives the open passages 28' a slight helical angle so that an incidental component of circumferential flow is imparted to the fluid stream when moving upwardly and freely through the rectifier. The purpose of the construction shown in Figure 4 is to obtain a slight offset of each blade 21' with respect to the preceding blade of the cascade. The offsets are in a direction so that at the beginning of any back flow, that is, downward flow in Figure 4, the leading edge of each blade 21' is unobstructed by the blade above. This permits the blades to impart circumferential flow to the fluid much more quickly than with blades located directly behind one another, as in Figure 3.

The preferred construction and one modification of the invention have been illustrated and described, but other changes and modifications can be made and some features can be used in different combinations, without departing from the invention as defined in the claims.

What is claimed is:

1. A fluid flow rectifier comprising a conduit having a core extending longitudinally therein, and of substantially smaller cross section than the conduit so as to leave a passage between the core and the wall of the conduit, and cascades of blades in said passage, the blades being of such limited extent in the passage that projections of the blades of different cascades on a transverse plane at right angles to the longitudinal extent of the conduit are spaced from one another on said plane and angularly around said core, and the cascades are separated from one another so as to leave open spaces between the cascades providing unobstructed longitudinal passages through the rectifier, the blades of each of the cascades being shaped to deflect the boundary layer of any rearward fluid flow in one passage transversely into the next passage on the other side of that cascade so as to transversely deflect the fluid flow in said other passage and thereby resist reverse flow of the fluid.

2. The fluid flow rectifier described in claim 1 and in which the core extends for only a part of the length of the conduit and the core is streamlined in the direction in which fluid is intended to pass through the rectifier.

3. The fluid flow rectifier described in claim 1 and in which the conduit and core are cylindrical so that the clearance passage between them is an annular passage.

4. A fluid flow rectifier comprising a cylindrical conduit, a core within the conduit and extending lengthwise thereof for only a part of the length of the conduit, the core being of circular cross section and of cylindrical shape throughout a substantial part of its length with end portions giving streamlined characteristics to the core, the diameter of the cylindrical portion of the core being substantially less than the inside diameter of the conduit so as to provide an annular passage between the core and the inside wall of the conduit, and cascades of blades within said passage, each cascade having a plurality of blades disposed in a row extending generally lengthwise of the rectifier, and the blades of each cascade being of limited circumferential extent and the cascades being angularly spaced from one another so as to leave open, unobstructed longitudinal passages through the rectifier between the cascades, the blades of each cascade being concave on the side toward the end of the rectifier toward which the forward flow moves, and the blades being oriented to deflect the boundary layer of any rearward fluid flow in one passage transversely to the next passage on the other side of that cascade so as to transversely deflect the fluid flow in said other passage and thereby resist reverse flow of the fluid.

5. The fluid flow rectifier described in claim 4 and in which the radical width of the annular passage between the core and conduit wall is less than one-half of the diameter of the core and is of substantially uniform cross section throughout the length of the cascades.

6. A fluid flow rectifier comprising a conduit with a core extending lengthwise thereof and spaced from the wall of the conduit to provide a fluid passage through the rectifier, and cascades of blades within the passage, the blades being of limited circumferential extent and the cascades being angularly spaced around the longitudinal axis of the conduit so as to leave open, unobstructed passages between the cascades for the flow of fluid through the rectifier, the blades of the cascades having generally concave faces on their sides toward the end of the rectifier to which fluid is intended to flow.

7. The fluid flow rectifier described in claim 6 and in which angular spacing of the cascades from one another is greater than the circumferential extent of the blades, and in which the cascades extend substantially parallel to the longitudinal axis of the conduit.

8. The fluid flow rectifier described in claim 6 and in which the angular spacing of the cascades is greater than the circumferential extent of the blades but the cascades extend in directions having a slight helical angle to the longitudinal axis of the rectifier.

9. The fluid flow rectifier described in claim 6 and in which the first few blades of each cascade at the downstream end of the rectifier have progressively greater angles to the axis of the conduit for imparting a circumferential direction of flow to the fluid in the event of back flow of the fluid in the rectifier.

10. A fluid flow rectifier comprising a conduit having a core extending for a portion of the length of the conduit with the cross section of the core substantially less than that of the conduit so as to provide a clearance passage between the core and the wall of the conduit, cascades of blades within said passage, the blades of each cascade being of limited circumferential extent and the cascades being angularly spaced from one another to leave open, unobstructed passages between the cascades extending lengthwise of the conduit, the blades having concave faces on their surfaces fronting toward the downstream end of the rectifier with the blades so disposed that the concave faces impart a circumferential direction of flow to fluid pressed against the blades from the downstream end of the rectifier, the discharge end of the passages between the blades having a longitudinal component of direction toward the downstream end of the rectifier for opposing back pressure of fluid in the open passages through the rectifier.

11. The fluid flow rectifier described in claim 10 and in which the angular spacing of the conduits is greater than the circumferential extent of the respective blades of the cascades, and in which the blades have convex faces fronting toward the upstream end of the rectifier and the first few blades at the downstream end of each cascade are at progressively greater angles to the longitudinal axis of the conduit in a direction toward the upstream end of the rectifier.

12. The fluid flow rectifier described in claim 10 and in which the angular spacing of the cascades is greater than the circumferential extent of the blades and the cascades extend at a slight helical angle to the longitudinal axis of the conduit and the blades have convex faces on their surfaces fronting toward the upstream end of the rectifier.

13. The fluid flow rectifier described in claim 10 and in which the edge of each blade, which is upstream in the circumferential flow, diverges rearwardly from a radius drawn across said clearance passage from the connection of the core with the upstream edge of the blade.

14. A fluid flow rectifier comprising a conduit with a core extending lengthwise thereof and spaced from the wall of the conduit to provide a fluid passage through the rectifier, and cascades of blades within the passage for setting up circumferential flow of fluid in the event of a reversal of the direction of flow, the blades being of limited circumferentinal extent and the cascades being angularly spaced around the longitudinal axis of the conduit so as to leave open, unobstructed passages between the cascades for the flow of fluid through the rectifier, the blades of the cascades having concave faces on their sides toward the end of the rectifier to which fluid is intended to flow, and the blades having at least their upstream edges, with reference to the circumferential flow, swept back toward their radially outer ends so that the upstream edges diverge from a radius of said fluid passage drawn through the radially inner ends of the upstream edges of the blades.

15. The fluid flow rectifier described in claim 14 and in which both the upstream and the downstream edges of the blades are swept back.

References Cited in the file of this patent

UNITED STATES PATENTS

| | | |
|---|---|---|
| 2,558,816 | Bruynes | July 3, 1951 |
| 2,618,925 | Wislicenus | Nov. 25, 1952 |
| 2,639,580 | Stuart | May 26, 1953 |
| 2,650,752 | Hoadley | Sept. 1, 1953 |
| 2,742,926 | Lacey | Apr. 24, 1956 |

FOREIGN PATENTS

| | | |
|---|---|---|
| 518,453 | Germany | Feb. 16, 1931 |